United States Patent Office 3,393,737
Patented July 23, 1968

3,393,737
ELECTROLESS METAL BONDING OF UNCONSOLIDATED FORMATIONS INTO CONSOLIDATED FORMATIONS
Edwin A. Richardson, Houston, Tex., assignor to Shell Oil Company, New York, N.Y., a corporation of Delaware
No Drawing. Filed Sept. 14, 1966, Ser. No. 579,223
13 Claims. (Cl. 166—29)

ABSTRACT OF THE DISCLOSURE

A method of consolidating formations by metalizing said formations by an electroless metal-plating process.

---

This invention relates to treating unconsolidated subsurface formations and more particularly to treatment of loose or incompetent earth formations surrounding well bores so as to consolidate said formations into a permeable, thermally and hydrolytically resistant consolidated formation for improved and efficient recovery of fluids from subterranean formations.

It is well known that many difficulties are encountered in producing fluids from incompetent earth formations due to collapsing or sloughing of the well bore walls. Numerous means are employed to alleviate this and among the methods and devices used to prevent collapsing and sloughing of unconsolidated formations is the use of perforated pipe liners, gravel packing or tubular screens or by injecting resin forming materials such as phenol-formaldehyde resins or epoxide resins which function as bonding and consolidating agents for weak formations. Still another method employed involves subjecting the incompetent formations to elevated temperatures so as to cause fusion of constituents therein, e.g., silica sand particles, to provide bonding agents. Still another means is to form carbonized or coked materials which act as binders to hold the formation as an integral consolidated mass. Essentially these methods and means for consolidating incompetent earth formations have serious limitations such as the mechanical devices mentioned tending to become plugged and generally being incapable of preventing fine particles from entering the production well. They also require cleaning and constant attention. The use of resin consolidating materials requires special equipment and a treatment process necessitating the presence of a drilling rig and the process is generally time consuming and costly. In essence the same applies to thermal means of consolidating formations as mentioned above or other similar means known to the art. In essence thermal and chemical means of consolidating loose or incompetent formations are inefficient, ineffective, costly and generally cause a decrease in permeability of the formation; and they lack desired resistance to changes in stresses, pressure, strains and temperatures normally encountered in producing effluent from such formations.

An object of the present invention is to provide an improved method of consolidating loose or incompetent subsurface formations. Another object of the present invention is to consolidate loose formations with a novel binding agent which is resistant to hydrolysis and is capable of withstanding great pressures, strains and stresses. Still another object of the present invention is to bind the grains of loose formations with a novel binding agent which is resistant to corrosion and is not affected by hot fluids such as water, steam and the like and is resistant to high thermal temperatures caused by combustion drives and the like. Still another object of the present invention is to form consolidated formations of good permeability for the recovery of hydrocarbon fluids therefrom. Still other objects and advantages will be apparent from the description and examples illustrating the present invention.

It has now been discovered that incompetent formations penetrated by wells can be effectively consolidated by penetrating such formations with an electroless metal-deposition solution capable of plating on the unconsolidated sand grain particles a metal coating which protects and binds together the grains of the formation. The electroless metal-deposition and consolidation of the formations can be effectively accomplished by penetrating an unconsolidated formation with an activator fluid capable of activating the non-catalytical grains of the formation, followed by contacting the formation with a metal-deposition solution containing chemicals inclusive of metal ions and a reducing agent, and effecting a chemical-reduction deposition of metal within the formation.

In consolidating oil-bearing loose formations for the recovery of hydrocarbon fluids therefrom by means of wells completed therein, it is preferable that prior to penetrating such formations with the activator and metal-deposition solutions that such formations be pretreated to displace oil and connate-water by injecting therein suitable solvents. During the activating of the components of loose formations, e.g., sand particles, by the activator solution and their consolidation with the metal-depositing solution, the solutions can be injected into the loose formations with or without an inert spacer fluid between the solutions. It is preferred that the formations be pretreated with a suitable solvent, prior to penetrating the loose formations with the activator fluid, followed by displacing the activator fluid with an inert fluid such as air or water or by a liquid composition containing a reducing agent and finally coating the loose formations with the metal-deposition solution.

Metal deposited on loose sand grains in unconsolidated earth formations form excellent binding agents which consolidate the loose sand grains into stable permeable integral formations capable of sustaining great compressive forces. Also the metal coatings on the grains form impermeable layers that protect the grains from destruction by hot fluids such as hot water and/or steam. The metal coating of siliceous components in earth formations also prevent dissolution of the silica that is contacted by hot aqueous fluids when such fluids are flowed through the earth formations, for example, in recovery of hydrocarbon fluids therefrom.

Normally, chemical-reduction depositions of metals can be effected on solid surfaces by immersing the solids within relatively large volumes of metal-deposition solutions. In such a situation, the ratio of the surface areas capable of being plated to the amount of chemicals present in the volumes of the solutions that are free to contact those surfaces are so small that the surfaces are plated without a significant depletion of the chemicals.

Under the metal-plating conditions of the present invention the chemical-reduction deposition of metal is effected on the solid surfaces in a porous mass of earth-formation material. In this situation, the ratio of the surface areas capable of being plated to the amount of chemicals present in the volumes of solutions that are free to contact those surfaces is relatively very large, since the solution must penetrate into the small interstices or pores that permeate the earth formation and the volume of solution that is free to contact the surface area of the wall of a given pore is small.

When an unconsolidated mass of sand grains is treated by appropriately impregnating the mass with an activator liquid and then with a metal-deposition solution containing chemicals inclusive of metal ions and a reducing agent, a metal is chemically deposited within the mass. In addition, the amount and disposition of the deposited metal are sufficient to bind the sand grains into a consolidated mass capable of sustaining compressive forces of many hundreds of pounds per square inch. Also the sand grains are coated with an impermeable layer of metal that protects them from being dissolved by hot aqueous fluids.

For the most effective results it is desirable to flow a plurality of pore volumes of both the activator solution and metal-plating solution through the interval of the formation into which the well is opened and preferably flowing pore volumes of each of said solutions through generally shaped zones, e.g., cylindrical or spherical zones having a diameter of from about 1 to about 5 feet around to open portions of a well borehole.

The results of effecting a chemical-reduction deposition of metal within a porous earth formation that surrounds the borehole of a well are such that this is a particularly advantageous process for treating such an earth formation. Where the earth formation is unconsolidated, the metal deposition provides a method of consolidation in which the chemical coats are no more than those of sand-consolidation procedures which have proven to be economically advantageous. Where the well is to be employed in the injection or production of hot fluids, the metal deposition provides a treatment that (a) consolidates any unconsolidated portions of the earth formation; (b) metal plates any siliceous components and prevents the dissolution of silica that tends to occur whenever a hot aqueous fluid is flowed through a siliceous earth formation that was naturally consolidated or was consolidated by a conventional sand-consolidation procedure; (c) metal plates and improves the stability of any intergranular bonding material that has been formed within the earth formation; and (d) reduces the heat loss that occurs within the tubing string of the production wells that extends into communication with the earth formation by depositing on the tubing strings a reflective metal plating that reduces the thermal emissivity of the tubing string.

In general, a chemical-reduction deposition of metal within a porous mass of earth-formation material is an advantageous procedure for improving the strength and stability of the mass. The electroless metal-depositing treatment provides a convenient and relatively economical procedure for binding a sand into a mold in which to solidify a molten material, such as a molten metal, for increasing the thermal or electrical conductivity of a mass of earth-formation material or for dispersing and fixing metals that are to be utilized as catalysts, activators, property indicators, or the like, within such a porous mass, etc.

In permeating a porous mass by the process of the present invention with the activator liquid, each element of the mass is preferably contacted with at least several pore volumes of the liquid. Palladium-activator solutions or stannous-activator solutions and/or hydrazine-activator solutions can be used, e.g., palladium chloride solution and/or stannous chloride solution can be used, or mixtures thereof or thorium nitrate solution or platinum chloride solution or colloidal metals of palladium or tin or solutions of bromides, nitrates and sulfates of palladium or tin can be used or the porous mass can be first treated with an acid solution such as sulfuric or hydrochloric acid solutions alone or in conjunction with the activator solutions.

The activator liquid may be displaced by an inert fluid, for example, by air where the liquid is drained from a mold, or by a liquid containing a reducing agent, or by the metal-depositing solution. In treating a subsurface earth formation, it is preferable to precede the above steps by a conventional oil- and connate-water-displacing procedure such as described in copending application Ser. No. 507,983, filed Oct. 22, 1965 and which issued on Dec. 27, 1966 as U.S. Patent 3,294,166 for Sand Consolidation With Epoxy Resin. Since this procedure generally displaces oil and connate-water films from the tubing string, such a pretreatment ensures that some metal deposition will occur in the injection tubing string when the metal-deposition solution is injected into the treated porous mass through said tubing string in the well bore in communication with the porous mass, and some thermal-emissivity reduction will be provided in respect to the thermal properties of the tubing string.

The metal-containing solution can be acidic having a pH of 2–6, preferably 4–6 or alkaline with a pH range of 8–14, preferably 8–10. The pH regulators can be acids such as hydrochloric or sulfuric acid or alkalizer such as amines, ammonium hydroxide, e.g., triethanolamine; caustic sodas, sodium carbonate, etc. Regulation and control of the pH of the solution is important to prevent heavy metal deposition at the inlet face of the formations to be consolidated and by this means more uniform metal deposition through the formation is accomplished. Also, the reaction rate of metal deposition on the surfaces to be consolidated is affected by temperature and for best results the pH of the solution is adjusted to be suitable for the temperature. Suitable temperatures should be from about 35° F. to about 200° F.

The metal plating compound can be a polyvalent metal compound of which preferred compounds include nickel, cobalt, copper, iron compounds and mixtures thereof, e.g., nickel and/or cobalt chloride and/or sulfate and these metal compounds are reduced by such reagents as hypophosphorous acid, hypophosphites, e.g., sodium hypophosphite or alkaline solution of molybdenate, formate and/or hydroxy carboxylates, e.g., hydroxy-acetate. The concentration of the metal-containing compounds and the reducing agents in aqueous solutions can be varied over a wide range such as from 1 to 50%, respectively and preferably from 5 to 40% each.

To keep the hydrogen evolution to a minimum during the reaction, the reducing agents in the metal-plating solutions should be kept at a minimum generally not in excess of 10% of the total electroless metal plating solution particularly when the solutions are alkaline. Also, hydrogen evolution can be effectively suppressed and the life of the metal-plating reaction increased by addition to such aqueous solutions buffering and chelating agents such as hydroxy carboxylic acids and polycarboxylic acids and their salts, e.g., citric, tartaric, maleic, gluconic, succinic acids or ammonium or alkali metal salts of said acids such as sodium citrate, sodium succinate and the like. However, the gas can be effectively eliminated from the area being metalized by applying pressure of 200 pounds or more on the system.

To promote wetting of the surfaces to be metalized by the electroless process of the present invention, wetting agents can be used such as reaction products of alkylphenol and alkylene oxide, e.g., nonyl phenol-ethylene oxide reaction product wherein the number of ethylene oxide units in the molecule ranges from 4 to 20; sulfated alcohols, sulfonate of fatty acids having from 12 to 18 carbon atoms, e.g., sulfonated oleic acid, sulfonated mineral oil fractions and the like.

Also, when using hypophosphites as the reducing agent their concentration should be controlled, since depending in part on the phosphorus content of the solution the metal being plated can be in the form of an alloy of metal-phosphorus nickel phosphide. High concentrations such as above 10% of hypophosphite in the metal plating solution tend to form these alloys.

In sand consolidation using resins as mentioned above, special equipment and techniques are needed in handling the liquid reactants and readying the well for use in production or injection operations. In such prior processes, resin-forming components are pumped through the wells in order to form porous cementing materials within the sands to be consolidated. Special fluid-injection equipment is used in order to prevent or reduce the deposition of resinous material within the well conduits. After the resin-forming components have been injected into the sands and allowed to react, which is an operation that requires from about eight to twenty-four hours, the special fluid-injection equipment is removed and the well is cleaned up for operation. This requires that a drilling rig be kept available at the well site and this involves a significant expense.

The present process avoids the need for delays and expenses of the above type. For example, when a new well is being treated, as soon as a casing has been installed and perforated, the tubing string and packer assembly that will be used in the normal operation of the well is run in and set. The drilling rig can then be released. The treatment fluids are subsequently injected by means of the relatively inexpensive equipment that is ordinarily employed for fluid cleanup types of well treatments. The well is ready for operational use as soon as the treatment fluids have been injected.

The metal-plating consolidation process of the present invention can be used to improve earth formations which have been consolidated by various resins such as epoxy resins or various other types by forming on the resin coated surface a metal coating that renders the consolidated formation resistant to hydrolysis at elevated temperatures, such as those encountered when hot water and/or steam is injected into such systems for secondary recovery of hydrocarbon fluids such as petroleum oil. The metalization of resin consolidated formations is effectively accomplished by the process of the present invention. This is particularly desirable in cases where resins used to consolidate formations are thermally stable but are hydrolytically unstable and tend to disintegrate on prolonged exposure to steam or hot water. The same applies to formations consolidated with quartz.

The following example serves to illustrate the present invention in which 20–30 mesh Ottawa sand was consolidated:

(1) The sand was packed in a pipe nipple and fitted with inlet and outlet Cu tubing. The entire system was immersed in a water bath at 190° F. Fluids were driven through the system with nitrogen using valves on the inlet and outlet to maintain 500 p.s.i. in the system.

(2) The following aqueous solutions were flushed through the sand in the order given:

(a) 10 pore volumes of ¼% $PdCl_2$ solution containing 1% concentrated HCl.

(b) 10 pore volumes of 3% $NaH_2PO_2$ solution.

(c) 120 pore volumes of the following solution at a rate of 1 pore volume per ¾ minute:

| | |
|---|---|
| $NiCl_2 \cdot 6H_2O$ | grams__ 30 |
| $NaH_2PO_2 \cdot H_2O$ | do____ 36 |
| $NH_4Cl$ | do____ 50 |
| Sodium citrate·$2H_2O$ | do____ 83 |
| Conc. $NH_4OH$ | cc__ 125 |
| $H_2O$ | cc__ 850 |

At the end of the final flush, the system was removed from the bath, flushed clean with water and cooled.

The sand was found to be consolidated with a compressive strength of 600 p.s.i. Little loss of permeability occured.

An inspection of a consolidated mass which has been crushed reveals that metallic bonding from grain to grain is very good and the one weak link on occasion is the adherence of the metal coating to the quartz in the structural chain.

The invention is further illustrated by the following example in which loose sand from a well in the Midway-Sunset Field in California was consolidated by the process of the present invention.

Conditions

Formation temperature during consolidation=90° F.
Absolute Pressure=500 p.s.i. or more at an injection rate of 0.1 b./m. per well bore foot.

Procedure (1) Rinse formation with at least 4 PV of toluene and 4 PV of isopropyl alcohol.

(2) Flush with 4 PV of the following activating solution:

| | |
|---|---|
| $PdCl_2 \cdot 2H_2O$ (59% Pd) | grams__ 0.16 |
| Conc. HCl (37%) | cc__ 2.0 |
| Nonylphenol-(ethylene oxide) 4–12 reaction product (Triton X–100) (Rohm and Haas) | cc__ 0.1 |
| Water | liters__ 1.0 |

Total volume of this solution is about 1 liter. About 1 hour with agitation is required to dissolve the palladium chloride.

(3) Flush with 66 PV of the following metal-plating solution at a rate of .76 PV/min. for 87 minutes (at 90° F. only):

| | |
|---|---|
| $NiCl_2 \cdot 6H_2O$ | grams__ 240 |
| $NaH_2PO_2 \cdot H_2O$ | do____ 288 |
| $NH_4Cl$ | do____ 396 |
| $H_2O$ | cc__ 2260 |
| Conc. $NH_4OH$ (30%) | cc__ 330 |
| Nonylphenol-(ethylene oxide) 4–12 reaction product (Triton X–100 (Rohm and Haas) | cc__ 3 |

Total volume of above is about 3 liters. About 15 minutes are required with agitation to dissolve.

(4) At end of above flush (3) consolidation is complete and well can be placed on production or injection.

Results (1) Consolidated sand has a compressive strength of about 3000 p.s.i. at the inlet face, diminishing almost linearly to zero at the outlet face of the pore volume.

(2) Sand packs have about 1 darcy permeability before consolidation and lose 30% as a result of the consolidation.

Resistive nickel consolidation of sand as described above to water flow at 400° F. has been excellent in two test runs of 10 days each whereas epoxy resin consolidation of such sands failed after 4 days of testing under similar conditions. Also, these consolidated sands had compressive strength of 4500–6000 p.s.i. whereas epoxy resin consolidations gave compressive strengths of less than 3000 p.s.i.

The above procedure can be modified by omitting the rinsing step (1) or by injecting solutions (1) and (2) into the sand formation stepwise or simultaneously.

The following compositions are additional examples of activating and metal plating solutions for consolidating loose formations with metal bonding agents.

| | 1 | 2 | 3 | 4 | 5 | 6 | 7 | 8 | 9 | 10 |
|---|---|---|---|---|---|---|---|---|---|---|
| Activating Compositions: | | | | | | | | | | |
| Stannous chloride | X | | | | | X | | | X | X |
| Platinum chloride | | | X | | | | | | | |
| Thorium nitrate | | | | | X | | | | | |
| Palladium bromide | | | | X | | | X | | | X |
| Palladium nitrate | | | | | | | X | | | |
| Palladium sulfate | | | | | | | | X | | |
| Hydrochloric acid | X | X | X | X | X | | | | | |
| Sulfuric acid | | | | | | | | X | | |
| Wetting agent, e.g., alkyl phenyl polyglycol ether | | | | | | X | X | X | X | X |
| Water to 1 liter | X | X | X | X | X | X | X | X | X | X |
| Metal-Depositing Composition: | | | | | | | | | | |
| Nickel chloride | X | X | | X | | | | | | |
| Nickel sulfate | | | X | | | | X | | X | X |
| Cobalt chloride | | | | | X | | | | | |
| Ferrous chloride | | | X | X | | | | | | |
| Ferrous ammonium sulfate | | | | | | | X | | | |
| Copper sulfate | | | | | | X | | X | | |
| Reducing Agents: | | | | | | | | | | |
| Sodium hypophosphite | X | X | X | | X | X | | X | X | X |
| Hypophosphorus acid | | | | X | | X | | | | |
| Buffering and Chelating Agents: | | | | | | | | | | |
| Sodium hydroxy acetate | | | | | | | | X | | |
| Sodium acetate | | | | | | | | | X | |
| Sodium citrate | | | X | | | X | | | | |
| Sodium succinate | | | | | | X | | | | |
| Ammonium citrate | | | | X | | | | | | |
| Ammonium chloride | | | | | | | | X | | |
| Ammonium hydroxide | | | | X | | | | | | |
| Triethanolamine | | | X | | | | | | | |
| N,N,N,N-tetrakis(2-hydroxy propyl)ethylene diamine | | | | | | | | | | |
| Tridosium phosphate | | | | | | | | X | | |
| Malic acid | | | | | | | | | X | |
| Malonic Acid | | | | | | | X | | | |
| Boric Acid | | | | | | | | X | | |
| Wetting Agents: | | | | | | | | | | |
| Alkylphenol-ethylene-oxide Reaction Product | | | | | | | X | X | | X |
| Water to 1 liter | X | X | X | X | X | X | X | X | X | X |

A notable feature of the present invention is not only binding loose formations by the electroless metalizing process of the present invention, but also that the process aids in reducing corrosion and heat loss of tubing strings used in the bore wells for when injecting the binding and activating fluids into the underground production areas the tubing strings are metalized by the process of the present invention. As these fluids are injected into the loose formations the tubing strings are also metalized with such materials as nickel or cobalt or nickel phosphide or cobalt phosphide or nickel-iron protective metal coatings, as well as other parts of the equipment and apparatus with which said metallizing fluids come in contact.

I claim as my invention:

1. A method of consolidating an incompetent formation penetrated by a well comprising:
   (a) injecting through the well and into the formation an aqueous solution containing an activating agent capable of activating the surface of the incompetent formation;
   (b) injecting through the well and into said formation an aqueous solution containing a metal-plating compound and a reducing agent; and,
   (c) injecting enough of said metal-plating compound solution to displace said activating agent solution and flow a plurality of pore volumes of the metal-plating compound solution through the interval of said formation into which the well is opened whereby metal is deposited in the formation and consolidation of the formation is achieved.

2. The method of claim 1 wherein the activating agent is a compound selected from the group consisting of platinum, palladium and stannous chlorides, and collodial metal of palladium or tin bromides, nitrates and sulfates of palladium or tin and mixtures thereof, or thorium nitrate; the metal-plating compound is selected from the group consisting of inorganic nickel, cobalt, copper and iron compounds and the reducing agent is selected from the group consisting of hypophosphorus acid, alkali metal hypophosphite, alkali metal molybdenate and mixtures thereof.

3. The method of claim 1 wherein the metal plating solution is injected into the incompetent formation at between 35° F. and 220° F.

4. The method of claim 1 wherein prior to injecting the activating and metal plating fluids, a solvent is injected into the incompetent formation to sweep oil and connate water therefrom.

5. The method of claim 1 wherein in solution (a) a small amount of hydrazine is added.

6. The method of claim 1 wherein prior to injection of solution (a) into the formation, the formation is pretreated with an acid solution.

7. A method of consolidating an incompetent formation penetrated by a bore hole of a well comprising:
   (a) injecting through a tubing string of the well and into the incompetent formation an aqueous activating agent solution containing a small amount of palladium chloride;
   (b) injecting into the formation through the tubing string of the well an aqueous metal-plating compound solution of nickel chloride and sodium hypophosphite at a temperature of between 35° F. and 220° F.; and
   (c) injecting enough of said metal-plating compound solution to displace said activating agent solution and flow a plurality of pore volumes of the metal-plating compound solution through the interval of said formation into which the well is opened whereby metal is deposited in the formation and consolidation of the formation is achieved.

8. The method of claim 7 wherein the nickel chloride solution is a basic solution.

9. The method of claim 7 wherein the nickel chloride solution is an acidic solution.

10. The method of claim 7 wherein prior to injecting solutions of steps (a) and (b) into the incompetent formation, an oil solvent is injected into the formation through the tubing string.

11. The method of claim 10 wherein the solutions of steps (a) and (b) are injected in increments.

12. The method of claim 7 wherein in solution (a) a small amount of hydrazine is added.

13. The method of claim 7 wherein prior to injection of solution (a) into the formation, the formation is pretreated with a mixture of toluene and isopropyl alcohol.

References Cited

UNITED STATES PATENTS

| | | | |
|---|---|---|---|
| 2,118,669 | 5/1938 | Grebe | 166—21 X |
| 2,238,930 | 4/1941 | Chamberlain et al. | |
| 2,690,402 | 9/1954 | Crehan | 117—54 X |
| 2,872,312 | 2/1959 | Eisenberg | 117—54 X |
| 3,342,262 | 9/1967 | King et al. | 166—29 |

CHARLES E. O'CONNELL, *Primary Examiner.*

I. A. CALVERT, *Assistant Examiner.*